(12) United States Patent
Moore, Jr.

(10) Patent No.: US 10,027,934 B1
(45) Date of Patent: Jul. 17, 2018

(54) PROHIBITING FACIAL EXPOSURE TO PROJECTED LIGHT

(71) Applicant: INTERNATIONAL BUSINESS MACHINES CORPORATION, Armonk, NY (US)

(72) Inventor: John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/397,100

(22) Filed: Jan. 3, 2017

(51) Int. Cl.
*H04N 9/31* (2006.01)
*G06K 9/00* (2006.01)

(52) U.S. Cl.
CPC ....... *H04N 9/3155* (2013.01); *G06K 9/00228* (2013.01); *H04N 9/3179* (2013.01)

(58) Field of Classification Search
CPC . H04N 9/3155; H04N 9/3179; G06K 9/00228
USPC .......................................................... 348/744
See application file for complete search history.

(56) References Cited

U.S. PATENT DOCUMENTS

| 6,361,173 | B1 | 3/2002 | Vlahos et al. |
| 7,984,995 | B2 | 7/2011 | Morrison et al. |
| 8,837,788 | B2 | 9/2014 | Hudgins |
| 9,268,520 | B1 * | 2/2016 | Cederlof ................... G06F 3/16 |
| 2008/0239250 | A1 * | 10/2008 | Jose ........................ G03B 17/54 |
| | | | 353/88 |

* cited by examiner

*Primary Examiner* — Michael Lee
(74) *Attorney, Agent, or Firm* — Griffiths & Seaton PLLC

(57) ABSTRACT

Embodiments for prohibiting facial exposure to projected light from a projector device by a processor. A location of a facial region of a user may be determined in relation to the projected light emitted from a light source of a projector that displays an image. A portion of the projected light may be inhibited from exposing a selected blackout region of the facial region.

14 Claims, 8 Drawing Sheets

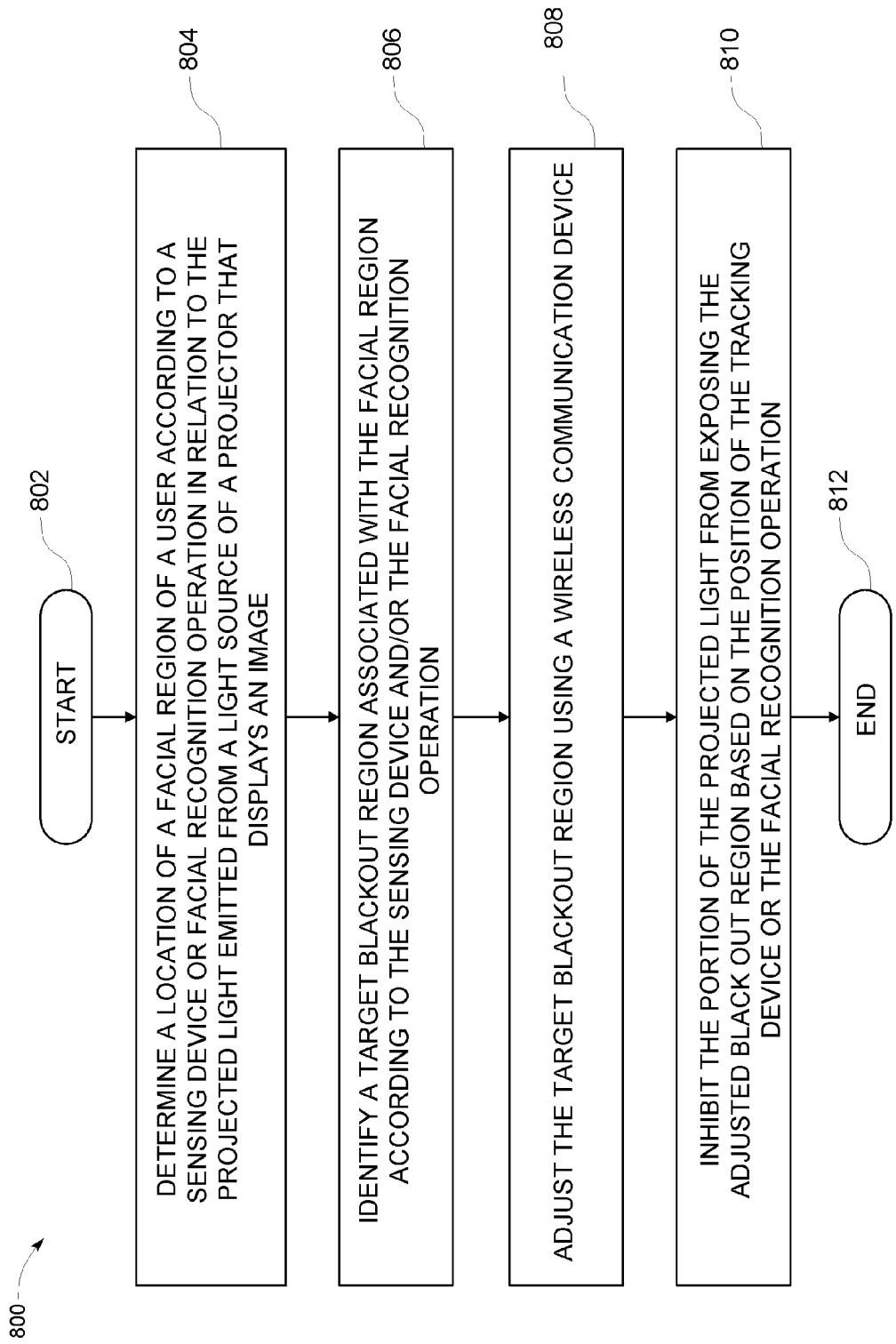

US 10,027,934 B1

PROHIBITING FACIAL EXPOSURE TO PROJECTED LIGHT

BACKGROUND OF THE INVENTION

Field of the Invention

The present invention relates in general to computing systems, and more particularly to, various embodiments for prohibiting facial exposure to projected light from various computer-controlled devices.

Description of the Related Art

Computing systems may be found in the workplace, at home, or at school. Such computing systems may include fixed robot devices, such as within an automotive factory or production line. In this way, performance costs are controlled and maintained. Moreover, the computing systems can include an Internet of Things (IoT), which is the interconnection of computing devices scattered across the globe using the existing Internet infrastructure. IoT devices may be embedded in a variety of physical devices or products, such as home appliances, manufacturing devices, industrial printers, automobiles, thermostats, smart traffic lights, vehicles, buildings, etc.

SUMMARY OF THE INVENTION

Various embodiments for configuring settings for prohibiting facial exposure to projected light from various computer-controlled devices by one or more processors, are provided. In one embodiment, by way of example only, a method for prohibiting facial exposure to projected light from a projector device, again by a processor, is provided. A location of a facial region of a user may be determined in relation to the projected light emitted from a light source of a projector that displays an image. A portion of the projected light may be inhibited from exposing a selected blackout region of the facial region. The projector may be in an Internet of Things (IoT) Network.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8 is an additional flowchart diagram depicting an exemplary method for prohibiting facial exposure to projected light from a projector device by a processor; again, in which aspects of the present invention may be realized.

DETAILED DESCRIPTION OF THE DRAWINGS

Figure 1:
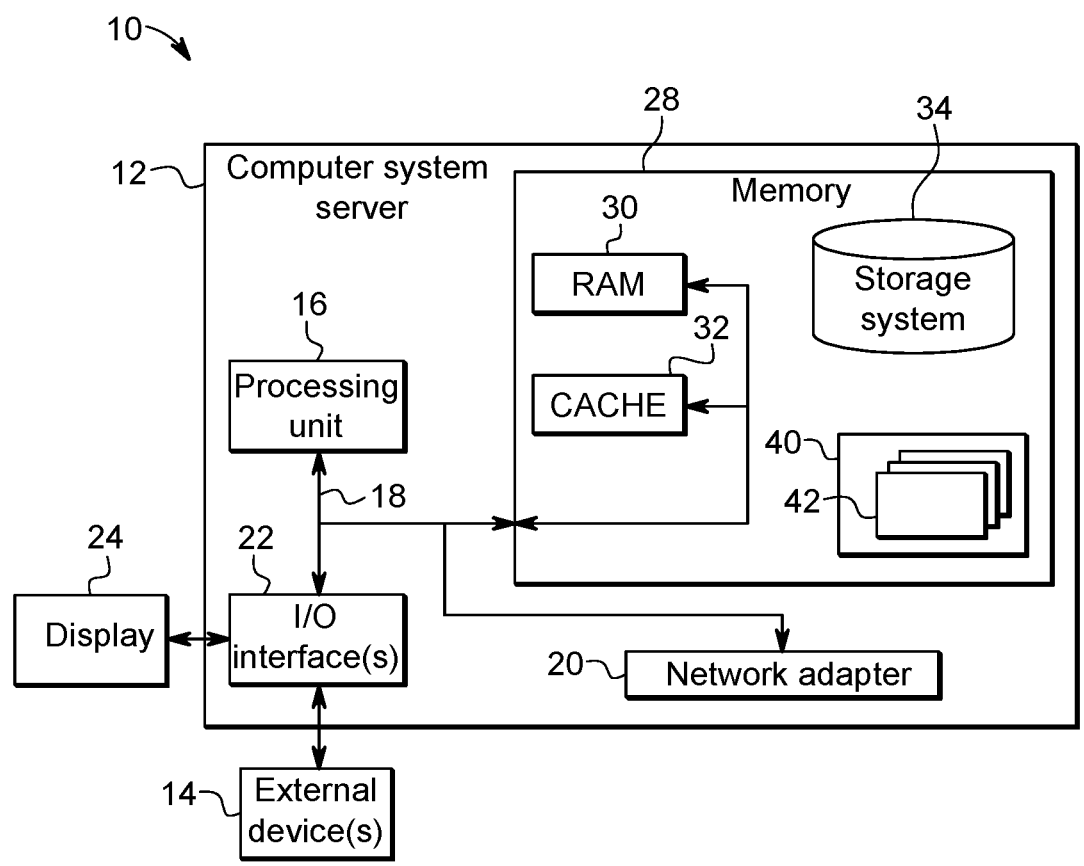
FIG. 1 is a block diagram depicting an exemplary cloud computing node according to an embodiment of the present invention.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include thermostats, sensor based devices, smoke alarms, lights, home appliances, audio systems, televisions, security cameras, security sensors, and heating, ventilation, and air conditioning (HVAC) zones, among countless other examples. Many of these objects are devices that are independently operable, but they may also be paired with a control system or alternatively a distributed control system such as one running over a cloud computing environment.

The prolific increase in use of IoT appliances in computing systems in a variety of settings provide various beneficial uses to a user. For example, a projector device may be employed in an IoT network environment. More particularly, presentations to an audience are frequently made with the assistance of a slide show, images or video media projected onto a projection screen by the projection device so that the image or video media is viewable by the audience. During the course of the presentation, various movements made by a presenter may result in the presenter being positioned between the projection screen and the projection device. More specifically, the presenter may interact with the image or video media resulting in the eyes of the presenter being exposed to projected light emitted from the projector which may be blinding or uncomfortable to the presenter.

Accordingly, the present invention provides a solution for configuring settings of the projector device for prohibiting facial exposure to projected light by one or more processors regardless of movements or positions of the presenter. In one embodiment, by way of example only, a method for prohibiting facial exposure to projected light for various computer-controlled devices, again by a processor, is provided. A location of a facial region of a user may be determined in relation to the projected light emitted from a light source of a projector that displays an image. A portion of the projected light may be inhibited from exposing a selected blackout region of the facial region. The projector may be in an Internet of Things (IoT) Network.

In one aspect, the present invention eliminates projected light from a projector (e.g., light emitting from a light source of the computing device) from exposing or shining the eyes of the presenter. In one embodiment, the projected light is inhibited or blocked from shining or exposing a target or "blackout" region for the facial region (e.g., the eyes) of the presenter. In one embodiment, the presenter may wear a sensor device that may be embedded within a wearable article or other computing devices (e.g., necklace, lapel pin, glasses, hearing aids, neck ties, earrings, watches, smart phones, etc.) on the presenter's person or clothing. In one aspect, the necklace, lapel pin, glasses, hearing aids, neck ties, earrings, watches, smart phones, and the like may be the sensor device. The sensor device may assist and aid the projector device in locating, identifying, or determining the target or "blackout" region for the facial region of the presenter in order to enable the projector device to determine where to inhibit or block the projected light.

In another embodiment, a projector device may use a camera and/or other computing devices that may be oriented towards the direction of the image or video media that is being displayed so as to search, locate, and identify a facial region of the presenter. The camera and/or other computing devices may use a facial attribute recognition operation to identify the blackout region, such as the region around the eyes of the presenter and at all times, creating a box/rectangle that is blacked out from the projectors light throw.

It should be noted that data is increasingly processed through a variety of geographically disbursed computing components, where, for example, a local node may contain a set of data processing components yet remain in remote communication with other portions of the distributed data processing system. To wit, a projector device and/or an IoT device's data may not be locally stored or processed on the user's local computer, but is instead hosted by one or more distributed storage components that are in remote communication with the local computer. This type of data storage may, in some cases, be referred to as "cloud," or "cloud-based" storage.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
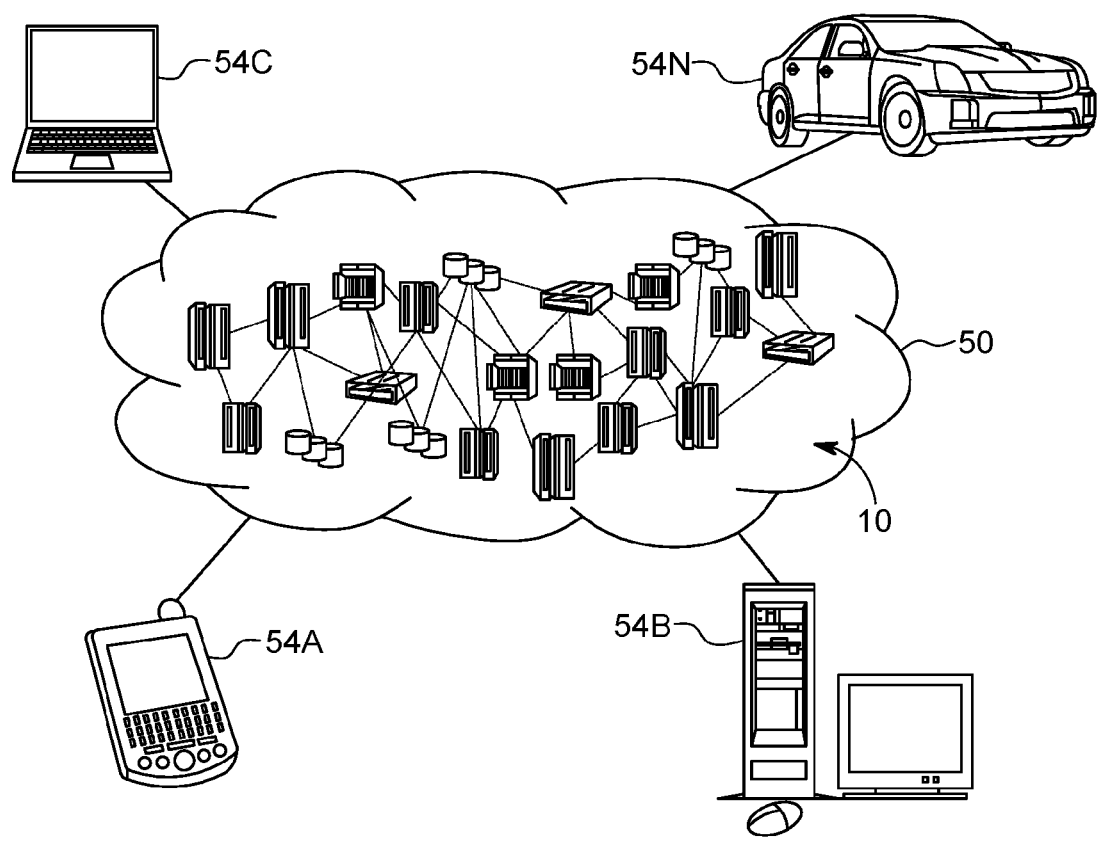
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
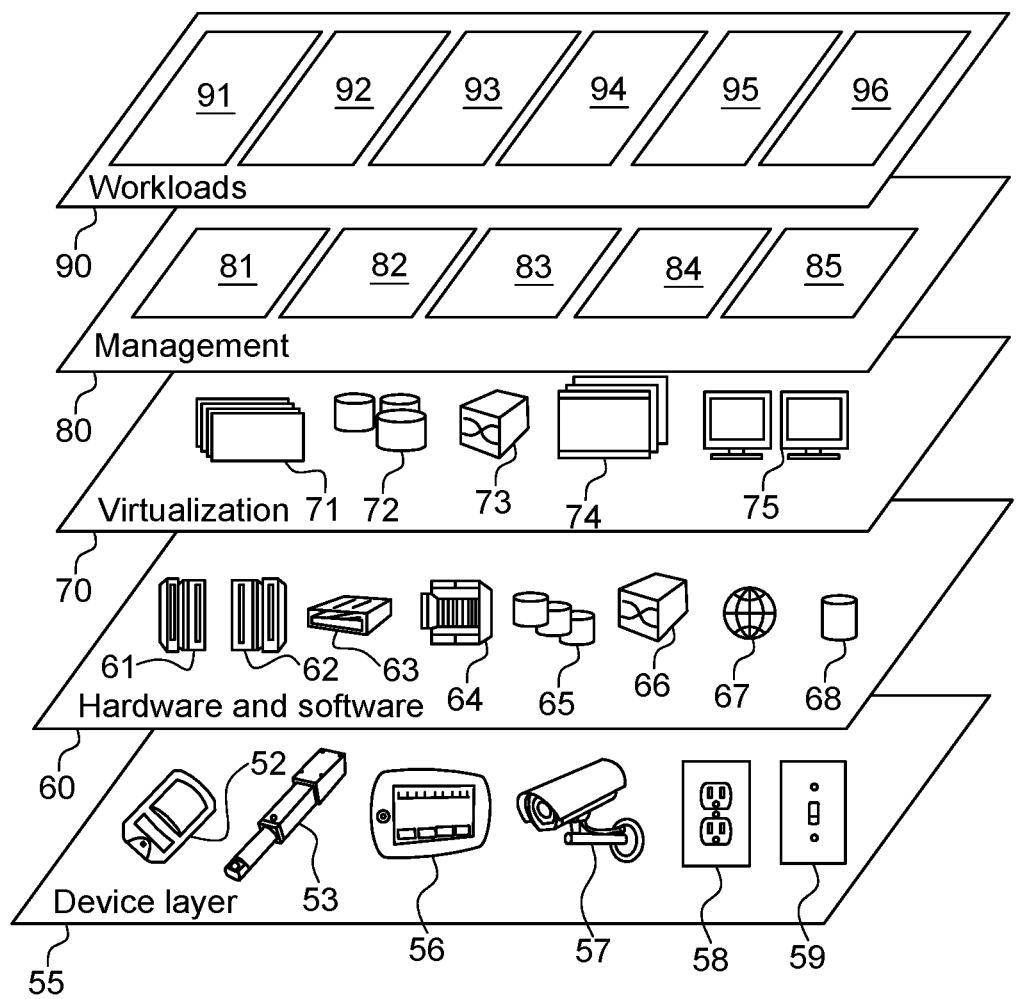
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices using image analysis workloads and functions 96. In addition, configuring settings for various computer-controlled devices using workloads and functions 96 for prohibiting facial exposure to projected light from a projector device may include such operations as data analysis (including data collection and processing from various environmental sensors), image analysis, light blocking or inhibiting operation, task and device analysis, and/or data analytics functions. One of ordinary skill in the art will appreciate that the configuring settings for various computer-controlled devices using workloads and functions 96 for prohibiting exposure to projected light from a projector device may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for prohibiting facial exposure to projected light from a projector device. In one aspect, prior to a user (or "presenter") beginning a presentation, which includes use of a projector device, the presenter may attach to the presenter's person or clothing a sensor device or a computing device (e.g., smartphone, smart watch, necklace, lapel pin, glasses, hearing aids, neck ties, earrings, watches, smart phones, etc.). The presenter may be positioned or oriented to the projector device in such a way that the sensor device or the computing devices may interact with and/or be in the line of sight of projected light emitted from the projector device. Using the sensor device or the computing device, the projector device may calibrate internal settings to determine one or more parameters (e.g., size, distance, and/or angle and the like) to determine where the presenter is and have the projector determine where to block out the projected light. For example, the projector may determine the sensor device or the computing device is at location or position of a neck region of the user and the projector may block the light coming from the projector in a target, black out region of the face (e.g., 9 inches wide by 6 inches in height) approximately 5-10 or 15-18 inches above the sensor device or the computing device and calibrated based on where the sensor device or the computing device is placed such as, for example, the distance of how low a necklace, which may include the sensor device or the computing devices, hangs from the facial region.

Figure 4:
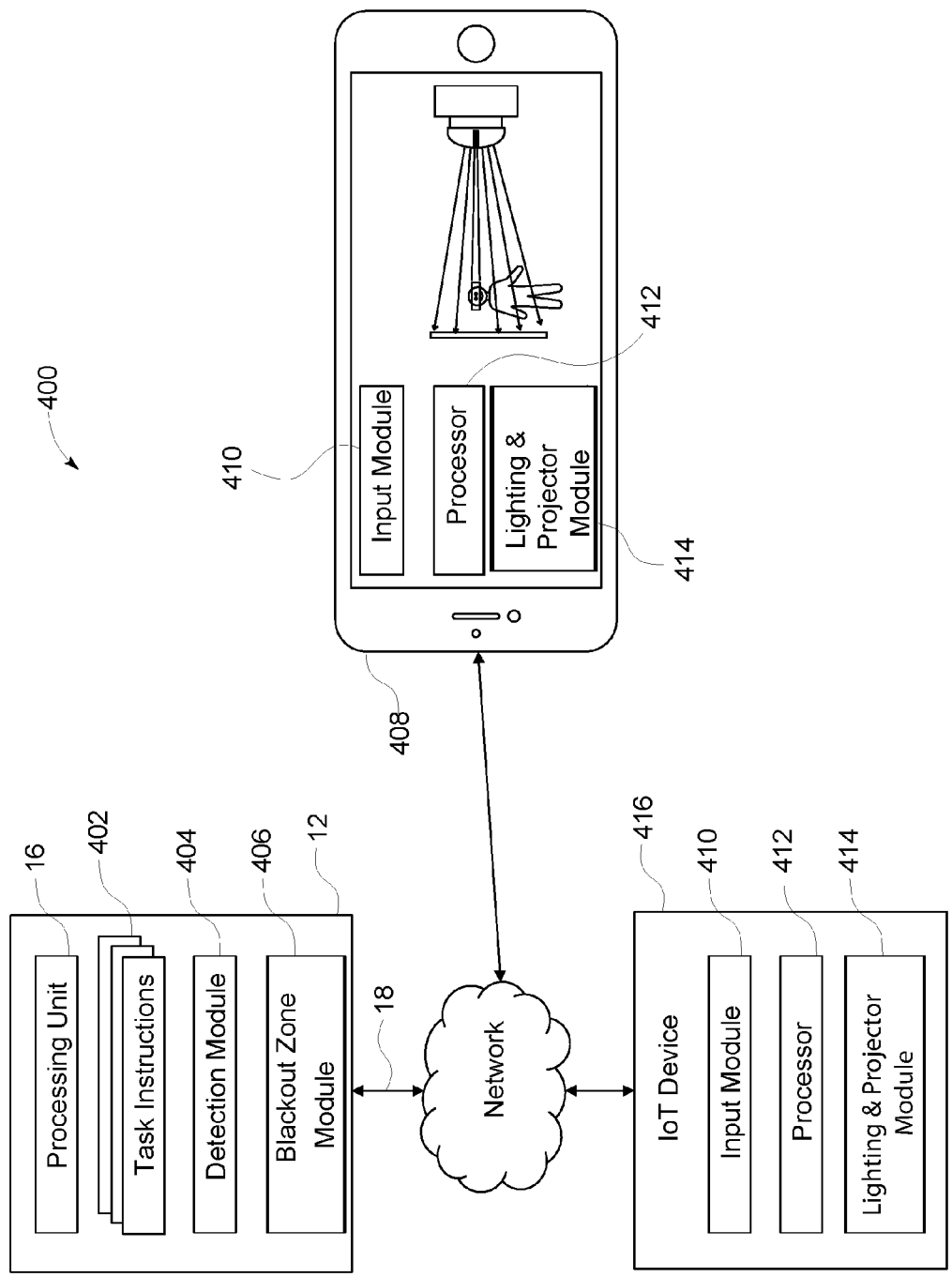
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. In one aspect, each of the devices, components, modules, and/or functions described in FIGS. 1-3 may also apply to the devices, components, modules, and functions of FIG. 4. Also, one or more of the operations and steps of FIGS. 1-3 may also be included in one or more operations or actions of FIG. 4. Computer system/server 12 is again shown, incorporating processing unit 16 to perform various computational, data processing and other functionality in accordance with various aspects of the present invention. A database of task (or activity/action) instructions (e.g., enable lighting, disable lighting, inhibiting lighting, adjust projector light source, adjust light blocking panel, and the like) 402 is shown, along with a detection module 404 and a blackout zone module 406 (e.g., target blackout zone/region module). That is, actions (e.g., enable lighting, disable lighting, inhibiting lighting, adjust projector light source, adjust light blocking panel) may be received, identified and/or interpreted for the received images of the presenter for prohibiting facial exposure to projected light from various computer-controlled devices, which may be associated with the central server, the cloud computing network, the local area network server, and/or the computing system of the IoT devices including an image capturing device. The detection module 404 may be used to assist in tracking, locating, and determining a location of a user and/or the facial region of the user (e.g., presenter). For example, the detection module 404 may be used to perform a facial recognition operation for recognizing a user's face and tracking a user's eye movement. In one aspect, the detection module 404 may be installed and/or included in the IoT device 416 and/or image capturing device 408. The detection module 404 may be used to perform a facial and/or eye movement detection, which may be tracked and/or identified from a sequence of images, which include the user's face and/or eyes, to identify a correlation between motion of the user's eyes and an expected motion of the user's eyes and/or measuring the eye's pupil size to identify a correlation between the effective light intensity of the projector device or on the user's face and its effect on the user's face (e.g., color change) and/or eye pupil size (increased size and/or decreased size).

In one aspect, the detection module 404 may utilize additional biometric devices or operations included with or associated with the IoT device 416 and/or image capturing device 408 including, for example, fingerprint sensors, speaker recognition hardware/software (e.g., a microphone and associated software for recognizing a speaker), and optical recognition capabilities (e.g., an optical scanner and associated software for scanning the retina of a user). Thus, for example, the speaker recognition operation may be used to determine and identify a user profile of the presenter to gather any stored data relating to the presenter (e.g., the height and size of the presenter) and/or to assist with determining the location of the presenter and/or facial region.

The blackout zone module 406 may determine, calculate, adjust, and/or calibrate a blackout zone of the presenter (e.g., an area around the eyes of a person) for prohibiting facial exposure to projected light from a projector device, such as IoT device 416. The processing unit 16 may be in association with and/or control the detection module 404 and the blackout zone module 406. A memory (not shown for illustrative convenience) may store data relating to the task instructions and the detection module 404 and the blackout zone module 406.

FIG. 4's components 400 as shown may also include an image capturing or recording device, such as image capturing device 408 and one or more IoT devices 416. In an additional aspect, the image capturing device 408 may include a smart phone, video camera, a camera, a tablet, computers, handheld devices, IoT device and the like, which may be included within and/or external to an IoT device, such as IoT device 416. The IoT device 416 may be a projector device having a light source for emitting an image and/or video media. The IoT device 416 may include a lighting and projector module 414, which is controlled by processor 412 for emitting a light.

The image capturing device 408 and IoT device 416 may be connected via communication channels (e.g., bus 18) through the network to the computer system/server 12 as shown. In one exemplary embodiment, a presenter may find themselves in a location where they desire to use the IoT device 416 for presenting a presentation. The image capturing device 408 of the user may have already located, and connected to, a wireless network. The image capturing device 408 may then connect through the local wireless network through the Internet to the computer system/server 12 to provide context metadata and, in turn, receive settings information and/or instructions from the computer system/server 12.

The image capturing device 408 and IoT device 416 may incorporate additional functional components 400 such as the depicted input module 410, processor 412, and lighting and projector module 414. Here again, the use of an input module 410 and task module 414 are merely for illustrative convenience as a variety of functional components 400 may be integrated into the image capturing device 408 and IoT device 416 to accomplish specific functionality to further the mechanisms of the illustrated embodiments.

Input module 410 may, in one embodiment, serve to receive image information provided by the image capturing device 408 and IoT device 416. For example, once the presenter is positioned or oriented in a desired location or position relative to the IoT device 416 (e.g., in a front section of the IoT device 416), candidate image or video, the input module 410 may receive input commands or selected data from text, markings and/or commands input into a touch screen or graphical user interface (GUI). For example, a menu option displaying a menu and/or list of a variety of tasks or subtasks via the GUI on the image capturing device 408 may be used to select the tasks or subtasks. The input module 410 may also receive a command to communicate the image to the computer system/server 12. The input module 410 may separate the commands from the image to be provided to the computer system/server 12. The relative position may also be provided through the input module 410 by a user's own input, or by other devices, such as 2D and/or 3D imaging and positioning models or sensors or Global Positioning System (GPS) sensor devices to indicate location. A variety of input data may pass through the input module 410 to be processed by the computer system/server 12.

In similar fashion, the lighting and projector module 414 may function for task communication between the image capturing device 408 and IoT device 416, so for example, when the image capturing device 408 communicates the captured image to the computer system/server 12, the computer system/server 12 provides to the lighting and projector module 414 on the IoT device 416 the task/activity settings, target areas, tasks/activities, instructions associated with the task/activity, images, object positioning data, other data, and/or a combination thereof. The computer system/server 12 may provide such data as saved task/activity instructions, task/activity assignments, defined tasks/activities, and/or calibrated or determined data according to the prohibiting facial exposure to projected light from various computer-controlled devices workflow, or a variety of other data that may pass through and be received by the lighting and projector module 414. The task/activity instructions, task/activity assignments, defined tasks/activities may include, but are not limited to, prohibiting a facial region of the presenter from being exposed to projected light from a projector device assisting or aiding the IoT device 416 in locating, identifying, or determining the target or "black out" region for a facial region of the presenter and enable the IoT device 416 to determine where to inhibit or block the projected light.

The lighting and projector module 414 may query or provide a menu option to a user, in one embodiment, whether they wish to provide, update, define, change one or more target areas (black out areas of the facial region such as the eyes), and/or provide other configurations and calibration data in association with inhibiting light projected from the IoT device 416 from exposing the presenter. This functionality may be provided by a graphical user interface (GUI) on the IoT device 416 and/or the image capturing device 408, which provides information to/from the computer system/server 12 and/or IoT device 416, or receives input and/or selection data from the user.

As one of ordinary skill in the art will appreciate, the depiction of the various functional units in computer system/server 12 is for purposes of illustration, as the functional units may be located within computer system/server 12 or elsewhere within and/or between distributed computing components. The task instructions 402 may include a data repository of various tasks, calculations, tracking data, light inhibiting data, and/or additional metadata information that is obtained from previously obtained tracked data, determined data, calculations, calibration, and/or information relating to the sensor device or the presenter (e.g., size and height of the presenter). The images themselves may also be stored in a corresponding database, which is not shown for purposes of illustrative convenience.

In an additional aspect, the detection module 404 and blackout zone module 406 of the computer system/server 12 may work in concert with processing unit 16 to accomplish various aspects of the present invention. For example, detection module 404 may undergo various data analytics functions associated with the task instructions 402 to identify and/or interpret a defined task that may be new and/or associated with previously stored task instructions or images. The detection module 404 (e.g., an analysis module) and blackout zone module 406 may also receive a captured image from the image capturing device 408 and analyze the image for one or more identified image elements. One or more settings of the device, such as IoT device 416, may be preconfigured to perform the action (e.g., task or activity relating to prohibiting facial exposure to projected light from various computer-controlled devices) based on the one or more identified image elements by the lighting and projector module 414 and communicated to an IoT device, such as IoT device 416.

The detection module 404 and/or blackout zone modules 406 may also select an IoT device, such as IoT device 416, from an available plurality of IoT devices to perform the action, such as, for example, prohibiting facial exposure to projected light from various computer-controlled devices. Based on the one or more identified image elements, one or more settings of an additional device may be preconfigured for performing an additional action in sequence with the action associated with the device.

Pursuant to identifying the image elements, a physical property associated with the image may be estimated, by the detection module 404 and/or blackout zone modules 406, to be subsequently used in determining one or more aspects of the performed action. Pursuant to estimating the physical property associated with the image by the detection module 404 and/or blackout zone module 406, a mass, an area, a volume, a length, a width, a height, a color, a temperature, an odor, an appearance, a texture, a density, a viscosity, a velocity, a location, an intensity, a luminance, a luminescence, a luster, or a concentration may also be estimated. The detection module 404 and/or blackout zone module 406 may also query the image capturing device 408 (e.g., user) for additional data supplanting the one or more identified image elements to associate the action.

The detection module 404 may also interpret a relative position of each selected object (e.g., presenter, projection screen, and/or projector device) relative to each other in a captured image that is associated with the defined tasks or activities. Blackout zone module 406 may make decisions in conjunction with the detection module 404 to identify, select, and provide additional tasks, if needed, to enable the IoT device 416 to perform the defined tasks, activities and instructions as described herein (e.g., prohibiting facial exposure to projected light from various computer-controlled devices). As one of ordinary skill in the art will appreciate, the detection module 404 and/or blackout zone module 406 may implement mathematical modeling, image processing, or other data processing technologies to carry out the various mechanisms of the illustrated embodiments.

Consider the following example of an implementation of the aforementioned functionality. In one aspect, using an image capturing device such as, for example, a handheld device (e.g., a smartphone or camera), a user may capture an object or image (e.g., the presenter, projection screen, and/or projector device). A component operating on the image capturing device may transmit the image to a central processing unit for analysis or may perform the analysis thereon. For example, the CPU may be a home/business Wi-Fi router that may communicate with each IoT device. The CPU and/or the image capturing device may analyze the captured image as follows. The image may be identified such as, for example, by using a cognitive application for visual recognition (e.g., the facial region of the presenter). A physical property associated with the image (e.g., the presenter, projection screen, and/or projector device) such as, for example, a mass, an area, a volume, a length, a width, a height, a color, a temperature, an appearance, a texture, a density, a viscosity, a velocity of light, a location, an intensity, a luminance, a luminescence, a luster, or a concentration may also be estimated. In one aspect, the exact physical property such as, for example, the luminance is not to be precisely calculated but to select a measure or estimated measurement of the physical property such as, for example, the brilliance or luminance.

Figure 5:
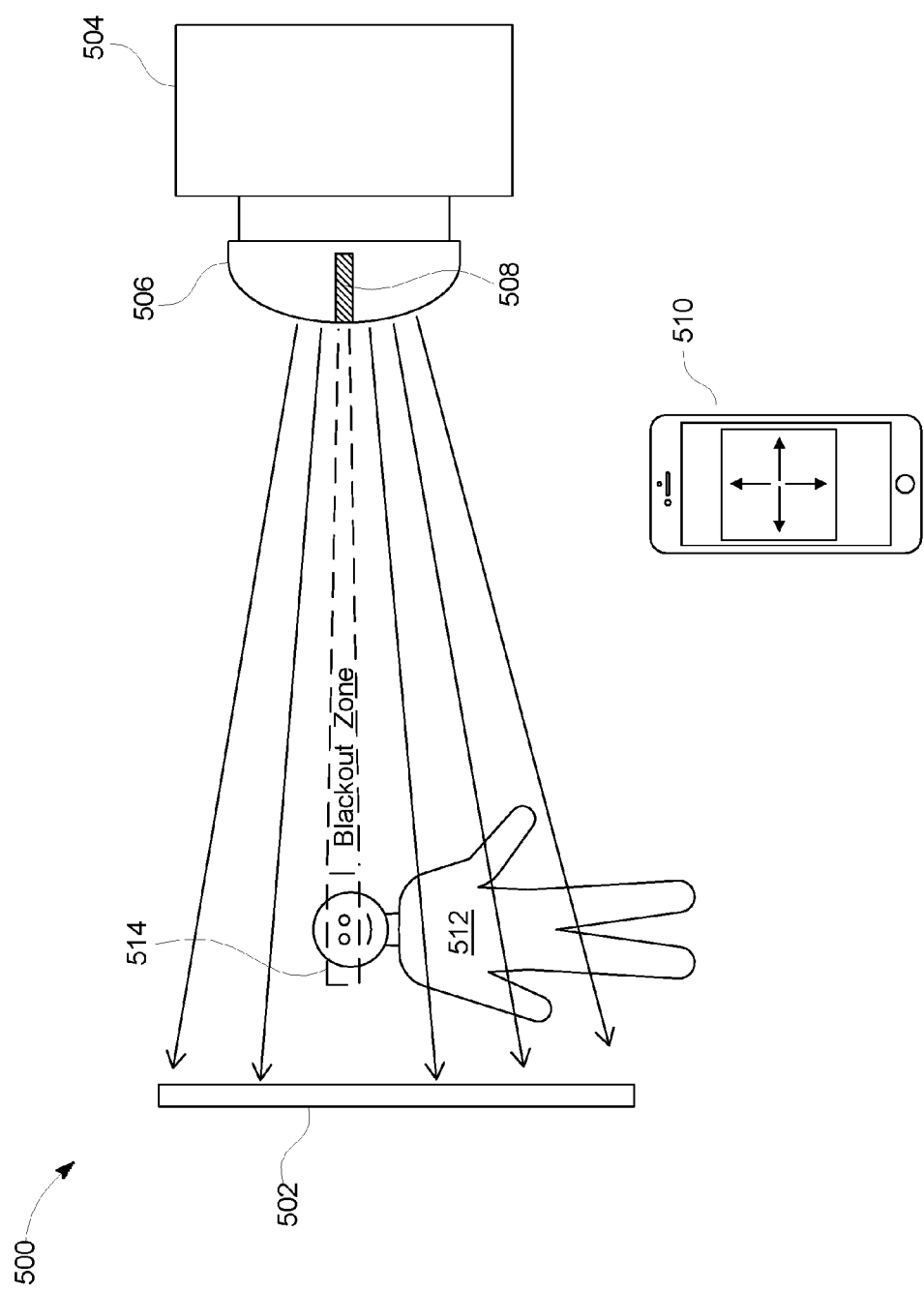
FIG. 5 is a diagram depicting a system for prohibiting facial exposure to projected light from a projector device in accordance with aspects of the present invention.

Turning now to FIG. 5, a diagram depicting a system 500 for prohibiting facial exposure to projected light from a projector device in accordance with aspects of the present invention. In one aspect, each of the devices, components, modules, and/or functions described in FIGS. 1-4 may also apply to the devices, components, modules, and functions of FIG. 5. Also, one or more of the operations and steps of FIGS. 1-4 may also be included in one or more operations or actions of FIG. 5.

FIG. 5 depicts a projector screen 502, a projector device 504 having a light source 506 and blocked out LEDs and/or inhibited light sector 508 (which may be a light blocking panel) and a user or presenter 512. The mechanisms of the embodiments provide a solution for prohibiting facial exposure to projected light from the light source 506 of the projector device 504 by one or more processors regardless of movements or positions of the presenter 512. In one embodiment, by way of example only, a location of a facial region of a user may be determined in relation to the projected light (e.g., the arrows coming from the light source 506 and pointing towards the projector screen 502) emitted from a light source 506 of a projector device 504 that displays an image on the projector screen 502. A portion of the projected light may be inhibited from exposing a selected black out region (e.g., "blackout zone") of the facial region such as, for example, at or near the eye region of the presenter 512. This enables the projected light from a projector device 504 from exposing or shining the eyes of the presenter 512 that are within the blackout zone.

In an additional aspect, a wireless communication device 510, such as, for example, a hand-held remote may be used by the user to adjust the target black-out region up, down, left or right so that a portion of the facial region (e.g., the eyes of the presenter within the blackout zone) are not exposed to the project light emitted from a light source 506 of the projector device 504.

In order to inhibit the facial region (e.g., "blackout zone") from being exposed to the project light emitted from a light source of the projector device (e.g., no light exposed in the blackout zone), if the projector device uses light-emitting diodes ("LEDs") to throw an image or video media onto a wall and/or screen, one or more of the LEDs which are associated with projecting light onto the blackout area, are not illuminated (e.g., inhibited light sector 508 which may be a light blocking panel or non-illuminated LEDs). As the presenter 512 moves from various places, the tracking of the facial area may adjust and/or re-determine the location of the blackout zone.

If the projector devices use a light bulb or other lighting device, a light blocking panel (e.g., inhibited light sector 508 caused by the light blocking panel) may be located in a front sector of the projector device 504 (e.g., within the light source 506). For example, the light blocking panel, which causes the inhibited light sector 508, may be located on the inside and/or outside portion of the light source 506 of the projector device which receives and passes the light emitting from the light source of the projector device 504. The light blocking panel (e.g., the inhibited light sector 508) enables greater accuracy in blocking out the light (e.g., a blackout zone 514) where it is determined and desired to black out, such as, the target, blackout zone 514 surrounding the facial region or eyes of the presenter. One or more motors (not illustrated for illustrative convenience) on an X and Y axis may be included in the projector device 504 and move the "blackout zone" around to one or more necessary locations, based on embodiments described herein.

In one aspect, the projector device 504 may be an IoT device in an IoT network. One or more settings (e.g., configuration settings) of the projector device 504 may be calibrated, determined, calculated, adjusted, and/or defined to enable the IoT device 504 (e.g., the projector device) to prohibit facial exposure to projected light from a projector device and may be based on a variety of calculations, calibrations, facial recognition operations, metadata, and captured image information. This information may include among other details, for example, the type of image capturing device, time of photography, focal length setting, shutter speed setting, lens and lens size information, two-dimensional (2D) object data, three-dimensional (3D) object data, and touch screen capability and functionality.

Figure 6:
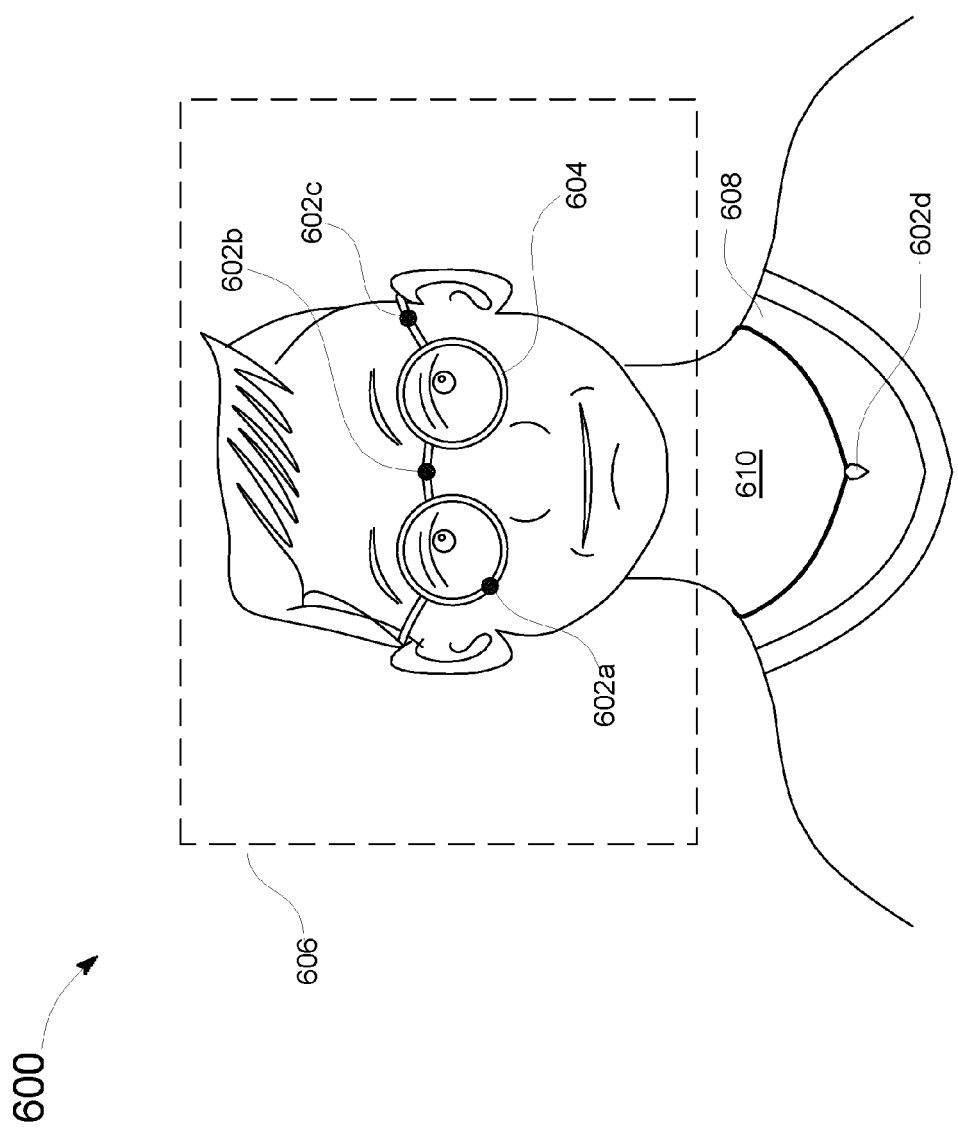
FIG. 6 is a diagram depicting a system for detecting a target black out zone using a sensor device for prohibiting facial exposure to projected light from a projector device in accordance with aspects of the present invention.

FIG. 6 is a diagram depicting a system 600 for detecting a target black out zone using a sensor device for prohibiting facial exposure to projected light from a projector device. In one aspect, each of the devices, components, modules, and/or functions described in FIGS. 1-5 may also apply to the devices, components, modules, and functions of FIG. 6. Also, one or more of the operations and steps of FIGS. 1-5 may also be included in one or more operations or actions of FIG. 6.

The system 600 includes a presenter (user) 610 and one or more sensor devices or computing devices 602 (illustrated in FIG. 6 as 602a-d). In one aspect, the presenter 610 may wear a sensor device 602 that may be embedded within a wearable article or other computing devices (e.g., necklace, lapel pin, glasses, hearing aids, neck ties, earrings, watches, smart phones, etc.) on the presenter's 610 person or clothing. In one aspect, the necklace, lapel pin, glasses, hearing aids, neck ties, earrings, watches, smart phones, and the like may be the sensor device 602. The sensor device 602a-d may assist and aid the projector device in locating, identifying, or determining the target or "black out" region for the facial region 606 of the presenter 610 to enable a projector device to determine where to inhibit or block the projected light of the facial region 606. Specifically, as illustrated in FIG. 6, a necklace 608 and/or a pair of glasses 604 are depicted with one or more sensor devices 602, such as sensor devices 602a-d.

In an additional aspect, prior to a user 610 (or "presenter") beginning a presentation, which includes use of a projector device (not shown in FIG. 6), the presenter 610 may be positioned or oriented towards the projector device in such a way that a computing device, camera, and/or the projector itself may perform a facial recognition operation to determine a region of the presenter 610 such as, for example, the facial area 606 (or eye area) of the presenter 610. Again, using a wireless communication device (see 510 of FIG. 5), such as, for example, the hand-held remote may be used by the user to adjust the target black-out region up, down, left or right so that a portion of the facial region 606 (e.g., the eyes of the presenter) is not exposed to the projected light emitted from a light source of the projector device.

In an additional embodiment, during a presentation phase, once any set up or calibration operations are completed, the presenter may commence with the presentation. The presenter 610 may start the presentation and an image capturing device (e.g., camera device or camera of the projection device of FIG. 4-5) associated with the projection device may track either the users face and/or the sensor device or the computing devices 602a-d on the presenter 610 to keep track of where to inhibit the facial region 606 (e.g., the eyes of the presenter) from being exposed to projected light emitted from a light source of a projector device. For example, glasses 604 include the sensor devices or the computing devices 602a-c while the necklace 608 may include the sensor device or the computing device 602d. Each sensor device 602 may be included in an IoT network and have computing hardware (e.g., a processor, memory, or other computing hardware) which may enable wireless communication with IoT devices in the IoT network.

Figure 7:
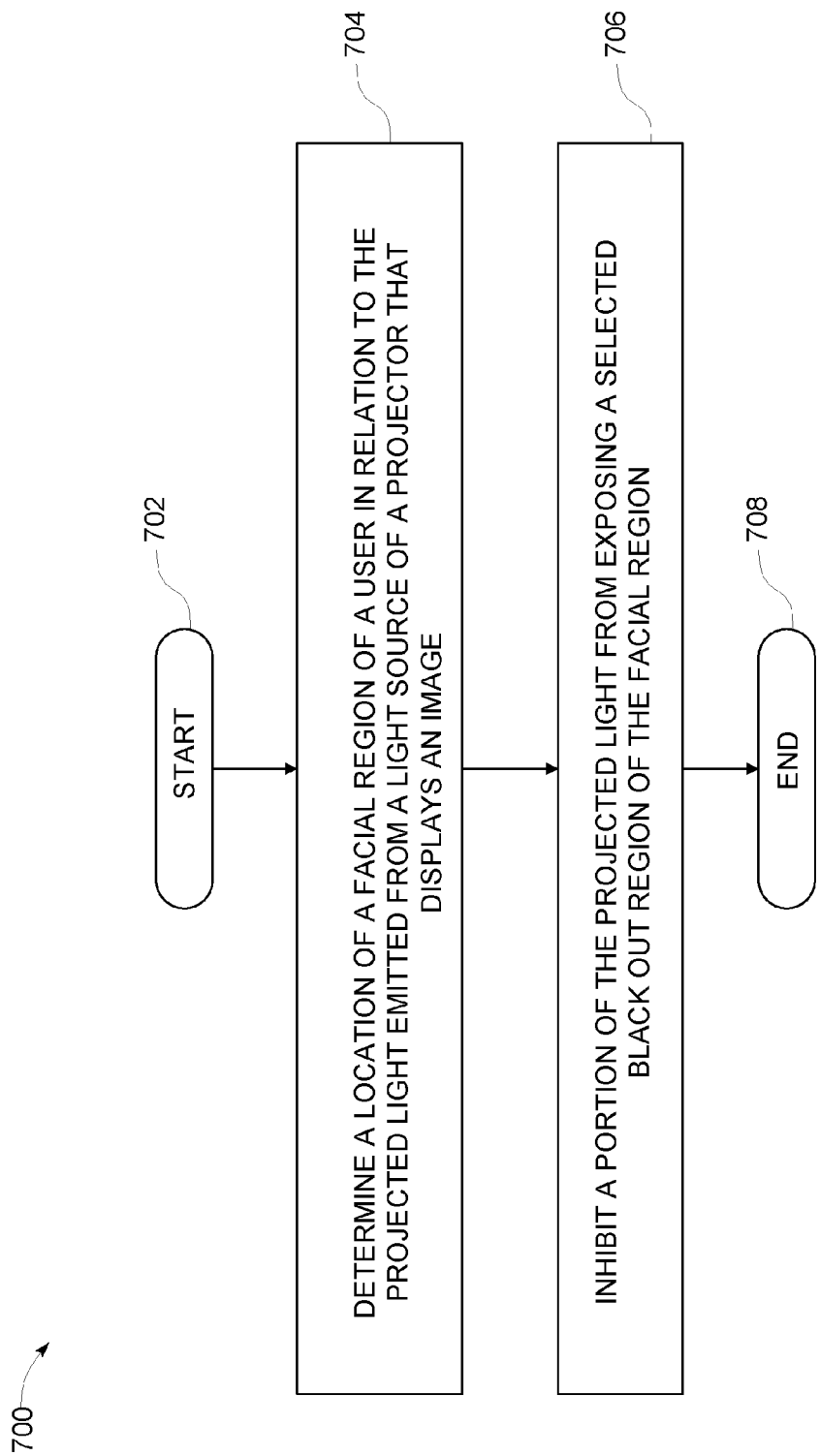
FIG. 7 is a flowchart diagram depicting an additional exemplary method for prohibiting facial exposure to projected light from various computer-controlled devices, again in which aspects of the present invention may be realized.

Turning now to FIG. 7, a method 700 for prohibiting facial exposure to projected light by one or more various computer-controlled devices by a processor is depicted. The functionality 700 may be implemented as a method executed as instructions on a machine, where the instructions are included on at least one computer readable medium or one non-transitory machine-readable storage medium. The functionality 700 may start in block 702. A location of a facial region of a user may be determined in relation to projected light emitted from a light source of a projector that displays an image, as in block 704. A portion of the projected light may be inhibited from exposing a selected black out region of the facial region, as in block 706. The functionality 700 may end in block 708.

Turning now to FIG. 8, a method 800 for prohibiting facial exposure to projected light by one or more various computer-controlled devices by a processor is depicted. The functionality 800 may be implemented as a method executed as instructions on a machine, where the instructions are included on at least one computer readable medium or one non-transitory machine-readable storage medium. The functionality 800 may start in block 802. A location of a facial region may be determined in relation to projected light emitted from a light source of a computing device such as, for example, a projector that displays an image, as in block 804. A target blackout region ("blackout zone") associated with the facial region may be identified according to a sensing device (or "sensor device") and/or the facial recognition operation, as in block 806. The sensor device may be embedded within a wearable article or other computing device on a user's person or clothing. The sensor device may assist and aid the projector device in locating, identifying, or determining the target or "blackout" region for the facial region of the presenter in order to enable the projector device to determine where to inhibit or block the projected light.

The target blackout region may be adjusted using a wireless communication device, as in block 808. A portion of the projected light may be inhibited from exposing the original blackout region and/or the adjusted blackout region based on the position of the tracking device or the facial recognition operation, as in block 810. The functionality 800 may end, as in block 812.

In one aspect, in conjunction with and/or as part of at least one block of FIG. 7 or 8, the operations of methods 700 and/or 800 may include each of the following. The operations of methods 700 and/or 800 may include capturing facial recognition features of the user using a facial recognition operation to determine the facial region in relation to the projected light, detecting a tracking device located on the user to select the selected blackout region in relation to a position of the tracking device, and/or inhibiting the portion of the projected light from exposing the selected blackout region based on the position of the tracking device.

The operations of methods 700 and/or 800 may include adjusting the selected blackout region using a wireless communication device in association with the projector. An adjustable block out panel may be used to inhibit the portion of the projected light from exposing the selected blackout region. Alternatively, a power source/supply may be discontinued to one or more light emitting diodes (LED) of the projector to inhibit the portion of the projected light from exposing the selected blackout region.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for prohibiting exposure to projected light, comprising:
   determining a location of a facial region of a user in relation to the projected light emitted from a light source of a projector that displays an image; wherein the determining further includes capturing facial recognition features of the user using a facial recognition operation to determine the facial region in relation to the projected light, the facial recognition operation further identifying a correlation between a motion of eyes of the user and an expected motion of the eyes of the user to identify a corresponding correlation between an effective light intensity of the light source and an effect of the effective light intensity on the facial region of the user;
   inhibiting a portion of the projected light from exposing a selected blackout region of the facial region; and
   adjusting the selected blackout region by the user using a wireless communication device in association with the projector.

2. The method of claim 1, further including detecting a tracking device located on the user to select the selected blackout region in relation to a position of the tracking device.

3. The method of claim 2, further including inhibiting the portion of the projected light from exposing the selected blackout region based on the position of the tracking device.

4. The method of claim 1, further including using an adjustable block out panel to inhibit the portion of the projected light from exposing the selected blackout region.

5. The method of claim 1, further including discontinuing a power supply to one or more light emitting diodes (LED) of the projector to inhibit the portion of the projected light from exposing the selected blackout region.

6. A system for prohibiting exposure to projected light, comprising:
   one or more processors, that:
      determines a location of a facial region of a user in relation to the projected light emitted from a light source of a projector that displays an image; wherein the determining further includes capturing facial recognition features of the user using a facial recognition operation to determine the facial region in relation to the projected light, the facial recognition operation further identifying a correlation between a motion of eyes of the user and an expected motion of the eyes of the user to identify a corresponding correlation between an effective light intensity of the light source and an effect of the effective light intensity on the facial region of the user;
      inhibits a portion of the projected light from exposing a selected blackout region of the facial region; and
      adjusts the selected blackout region by the user using a wireless communication device in association with the projector.

7. The system of claim 6, wherein the one or more processors detects a tracking device located on the user to select the selected blackout region in relation to a position of the tracking device.

8. The system of claim 7, wherein the one or more processors inhibits the portion of the projected light from exposing the selected blackout region based on the position of the tracking device.

9. The system of claim 6, wherein the one or more processors uses an adjustable block out panel to inhibit the portion of the projected light from exposing the selected blackout region.

10. The system of claim 6, wherein the one or more processors discontinues a power supply to one or more light emitting diodes (LED) of the projector to inhibit the portion of the projected light from exposing the selected blackout region, wherein the projector is in an Internet of Things (IoT) Network.

11. A computer program product, for prohibiting facial exposure to projected light by one or more processors, the computer program product comprising a non-transitory computer-readable storage medium having computer-readable program code portions stored therein, the computer-readable program code portions comprising:
   an executable portion that determines a location of a facial region of a user in relation to the projected light emitted from a light source of a projector that displays an image; wherein the determining further includes capturing facial recognition features of the user using a facial recognition operation to determine the facial region in relation to the projected light, the facial recognition operation further identifying a correlation between a motion of eyes of the user and an expected motion of the eyes of the user to identify a corresponding correlation between an effective light intensity of the light source and an effect of the effective light intensity on the facial region of the user;
   an executable portion that inhibits a portion of the projected light from exposing a selected blackout region of the facial region; and
   an executable portion that adjusts the selected blackout region by the user using a wireless communication device in association with the projector.

12. The computer program product of claim 11, further including an executable portion that:

detects a tracking device located on the user to select the selected blackout region in relation to a position of the tracking device; and inhibits the portion of the projected light from exposing the selected blackout region based on the position of the tracking device.

13. The computer program product of claim 11, further including an executable portion that uses an adjustable block out panel to inhibit the portion of the projected light from exposing the selected blackout region.

14. The computer program product of claim 11, further including an executable portion that discontinues a power supply to one or more light emitting diodes (LED) of the projector to inhibit the portion of the projected light from exposing the selected blackout region, wherein the projector is in an Internet of Things (IoT) Network.

* * * * *